Dec. 29, 1964  J. L. GILLIAM  3,162,971
SINKING ARTIFICIAL LURE
Original Filed Jan. 31, 1962
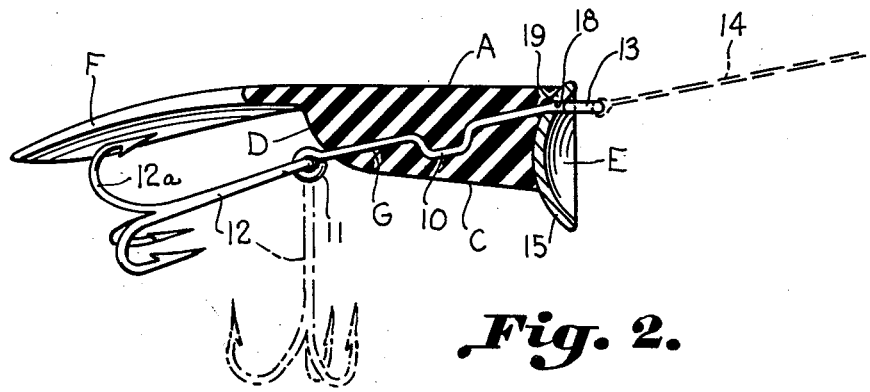
Fig. 2.
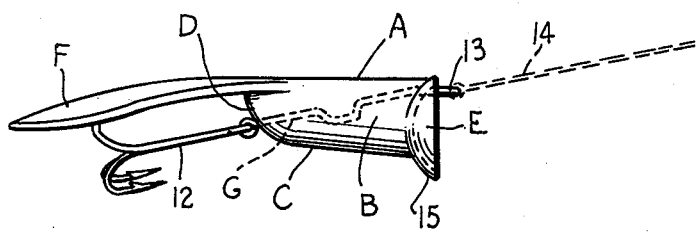
Fig. 1.
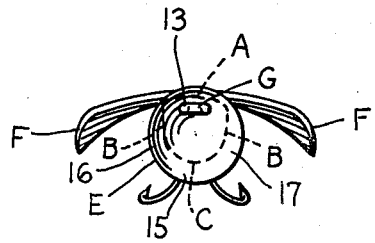
Fig. 3.
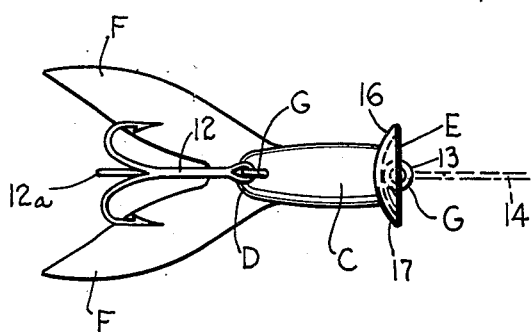
Fig. 4.
INVENTOR.
JOE L. GILLIAM
ATTORNEY

United States Patent Office 3,162,971
Patented Dec. 29, 1964

3,162,971
SINKING ARTIFICIAL LURE
Joe L. Gilliam, 114 E. Ross St., Tampa, Fla.
Continuation of application Ser. No. 170,050, Jan. 31, 1962. This application July 25, 1963, Ser. No. 299,449
1 Claim. (Cl. 43—42.3)

This invention relates to fishing lures and particularly to a sinking artificial lure having side to side movement.

While sinking lures are generally well-known, there are none presently available which sink and provide an oscillating side to side movement and yet afford substantial lateral stability. This invention contemplates providing such a lure in the form of a simple integral construction. The lure is shaped like a large insect having wings and may be easily decorated by painting, including addition of the appearance of insect eyes (not shown) to add to its effectiveness as a fish lure. This is a continuation of my copending application filed January 31, 1962, bearing Serial No. 170,050, now abandoned.

Accordingly, an important object of this invention is to provide an improved sinking lure having side to side oscillating movements.

Another object of the invention is the provision of a sinking lure having unitary construction capable of providing an especially desirable appearance as a fish lure.

Another object of the invention is to provide a sinking lure having an integral construction which affords a side to side movement without the addition of weights and to which the hooks and line may be easily attached.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a side elevation illustrating a lure constructed in accordance with the present invention, FIGURE 2 is an enlarged longitudinal sectional elevation of the lure shown in FIGURE 1, FIGURE 3 is a front elevation of the lure shown in FIGURE 1, and FIGURE 4 is a bottom view of the lure shown in FIGURE 1.

Referring more particularly to the drawing, a sinking artificial lure constructed in accordance with the invention is illustrated. An elongated body portion has a substantially flat upper surface A with downwardly extending sides B tapering slightly inwardly joining a convex lower portion C. The lower portion C curves upwardly toward the rear forming with the side portions B which taper rearwardly and inwardly and the rearwardly and inwardly tapering upper surface A, a terminus D of said body potion. A concave substantially circular front plate E is attached to the front of said body portion, the top of said front plate being in substantial alignment with the upper surface of said body portion. The front plate E extends marginally of said body portion and for a substantial distance below the lower portion of said body portion. The edge of said front plate E is substantially at right angles with the upper surface A of said body portion. A pair of diverging substantially flat wing-like members F extend from the upper surface of said terminus and taper downwardly toward the rear. Means G is carried by said body portion for attaching hook means adjacent the lower surface of said terminus and for attaching a line adjacent the top of said front plate. Side to side sinking movement of the lure is effected through the combined action of the above elements.

The elongated body portion of the lure, together with the wing-like members F is preferably formed from molded rubber and the like thus, providing a generally unitary construction for the lure. It will be noted that the body through the shape of its upper surface A, its sides B and its lower portion C, generally tapers inwardly rearwardly to form a terminus D facilitating movement of the lure through the water.

The means G, in the form of an elongated rod, for attaching the hook and line is preferably molded into the body and has an offset intermediate portion 10, securely fixing the rod within the body. The rod has a relatively small eye 11 for attaching the hook means adjacent the lower portion of the terminus D. Hooks may be provided in the form of a treble hook arrangement 12 illustrated, in which one of the hooks 12a is spaced between the diverging wing-like members F. The eye 11 should be small so as to limit the movement of the hook arrangement 12 to that illustrated in FIGURE 2.

The other end of the shaft G is provided with another eye 13 for attaching a line 14. The front plate E, preferably metal, is illustrated as being circular and is preferably substantially circular to the extent that it provides a portion 15 projecting downwardly of the body of the lure and provides marginal portions 16 and 17 extending outwardly beyond the sides B. The concave front plate E is positioned so that the free edge thereof is at right angles with respect to the upper surface A, and may be secured in such position by passing rod G through aperture 18 in the plate E and welding same in position as at 19. The eye 13 described above should thus be formed after the front plate E is thus positioned.

The sinking movement is effected by the downwardly extending portion 15 of the front plate together with the action of the diverging wing-like members F which extend downwardly toward the rear. These flat wing-like members F provide substantial lateral stability and enhance the appearance of the lure. The marginal portions 16 and 17 afford side to side movement to the tapered body about a vertical axis passing through the center of gravity of the lure. This movement is caused by water pressure building up first on one marginal portion and then the other. The extraordinary stability of the lure is illustrated by the fact that, if the lure should strike the water after a cast on its back, it will right itself due to the weight of the downward extension 15 and the action of the water on the front plate E.

While a preferred embodiment of the invention has been described using specific terms, such description is for illustrative purposes only, and it is understood that changes and variations may be made without departing from the spirit or scope of the following claim.

What is claimed is:

A sinking artificial lure including, an elongated body portion constructed from molded rubber and the like, said body portion having a substantially flat upper surface tapering inwardly toward the rear, sides tapering slightly inwardly, downwardly and rearwardly and a convex lower portion curving upwardly toward the rear, a terminus of said body portion formed by said lower portion curving upwardly toward the rear joined with the side portions which taper slightly inwardly, downwardly and rearwardly and joined with the flat upper surface which tapers inwardly toward the rear, a concave substantially circular front plate attached to the front of said body portion, the top of said front plate being in substantial alignment with the upper surface of said body portion, said front plate extending marginally of said body portion and for a substantial distance below the lower portion of said body portion, the edge of said front plate being substantially at right angles with said upper surface of said body portion, a pair of flexible diverging substantially flat wing-like members originating at the upper surface of said terminus integrally with the body, said wing-like members tapering downwardly and outwardly of the body toward the rear, and means carried by said body portion for attaching hook means adjacent the lower surface of said terminus and for attaching a line adjacent the top of said front plate, whereby side to side movement of the lure is effected by the marginal portions of the front plate, and whereby sinking movement is effected by the portion of the front plate extending below the body stabilized by the wing-like members tapering downwardly toward the rear when the lure is moved in the water.

References Cited by the Examiner
UNITED STATES PATENTS

| | | | |
|---|---|---|---|
| 2,387,255 | 10/45 | Godlewski | 43—42.06 XR |
| 2,515,018 | 7/50 | Parnell | 43—42.3 |
| 2,517,299 | 8/50 | Gaylord | 43—42.47 XR |
| 2,817,922 | 12/57 | Takeshita | 43—42.37 XR |

ABRAHAM G. STONE, *Primary Examiner.*